Patented Sept. 3, 1929.

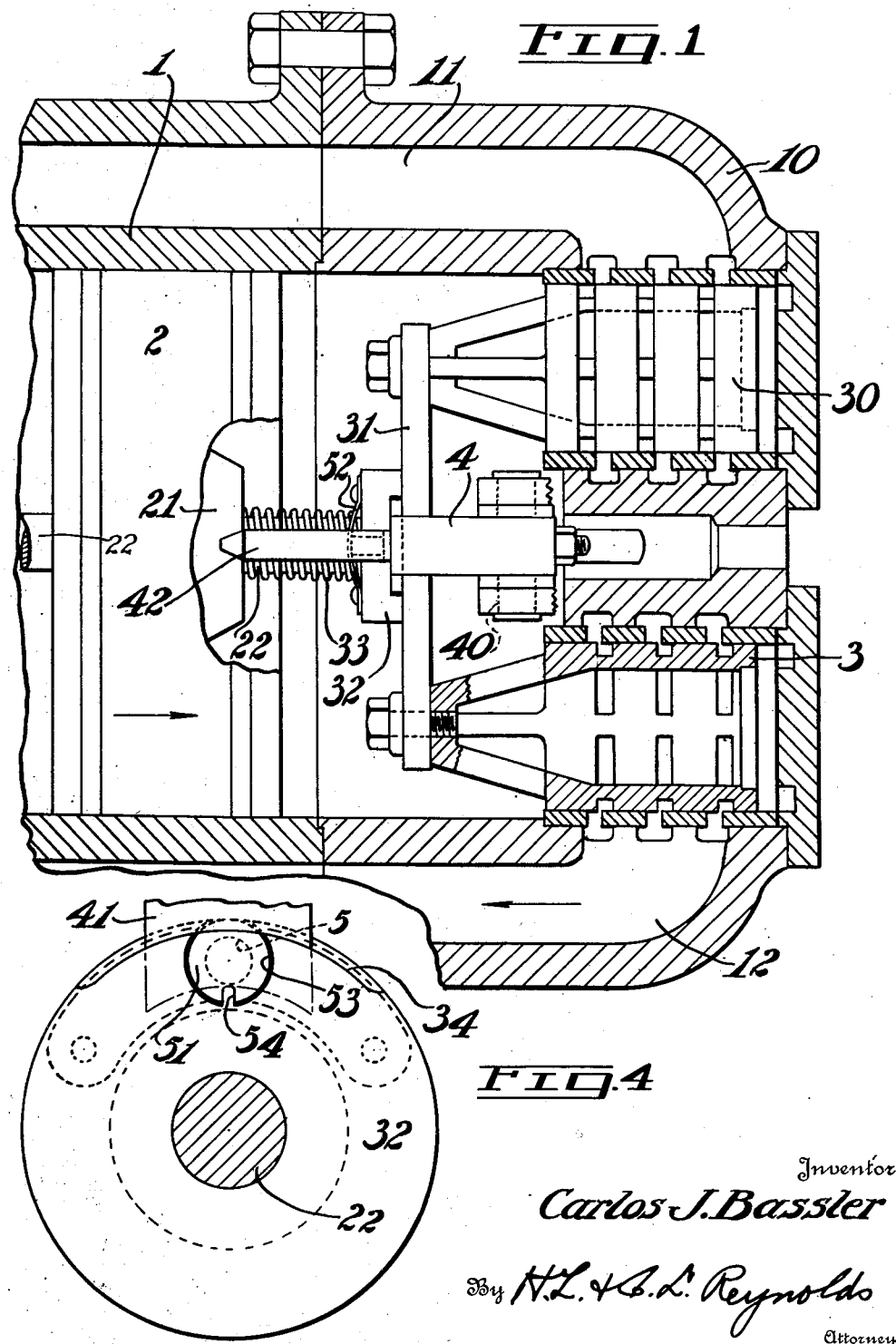

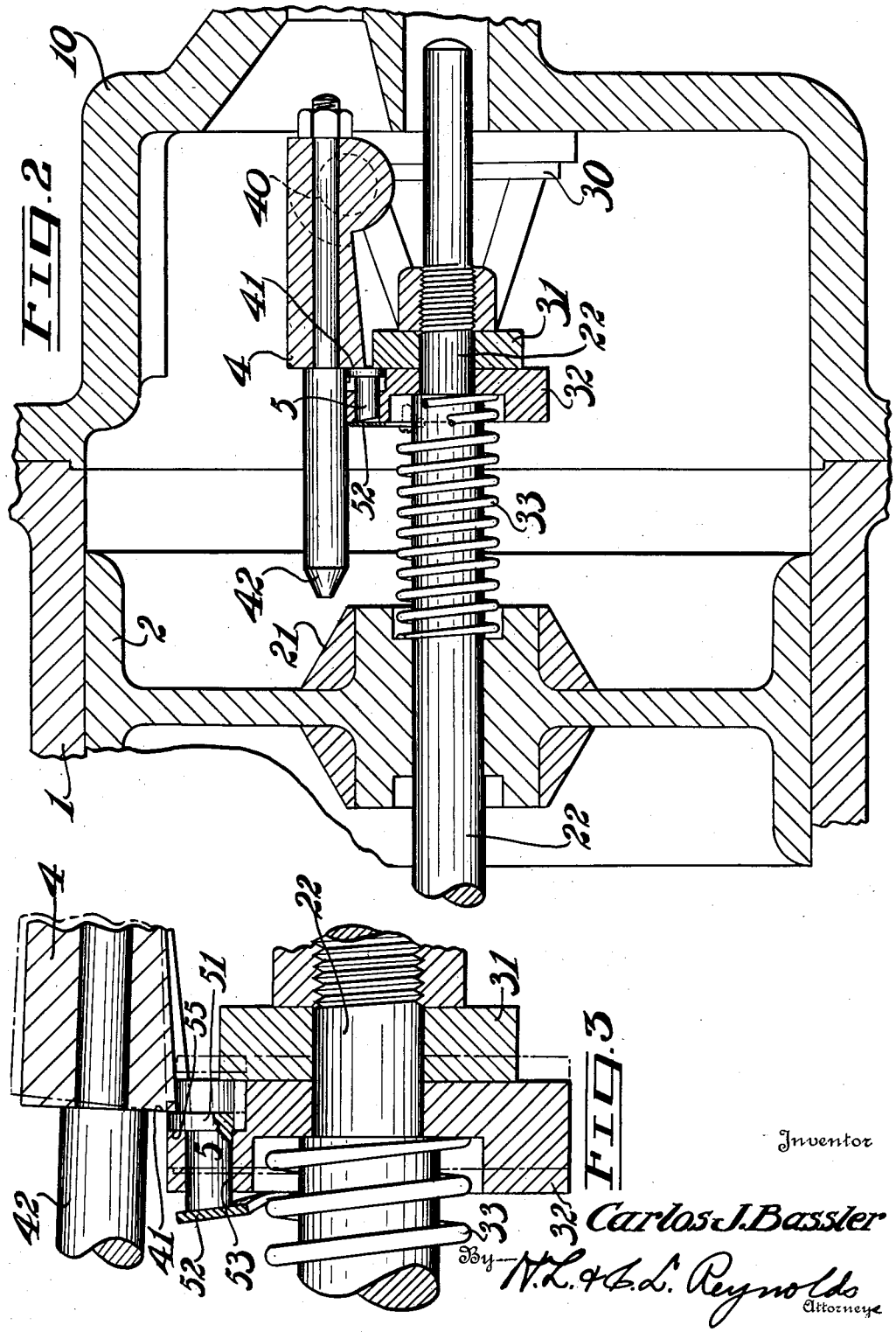

1,726,975

UNITED STATES PATENT OFFICE.

CARLOS J. BASSLER, OF PORTLAND, OREGON, ASSIGNOR TO AMERICAN LIQUID METER COMPANY, OF PORTLAND, OREGON, A CORPORATION OF WASHINGTON.

VARIABLE-SPEED COMPENSATING DEVICE FOR FLUID METERS.

Application filed September 6, 1921. Serial No. 498,859.

My invention relates to fluid meters and particularly to a device by means of which variations in the meter output, due to variations in the velocity of the fluid through the meter may be compensated for, and consequently its accuracy may be greatly increased.

The principal object of my invention, broadly stated, is to produce means which will compensate automatically for variations in the meter's accuracy which are due to varying velocities of the fluid through the meter.

More specifically, it is my object to provide mechanism, for use in a meter employing a piston movable under fluid pressure as the metering agent and valves reversible in position through movement of the piston as the controlling agents, whereby the amount of fluid passing the valves during the period of time elapsing while the valves move from an open to a fully closed position is a constant, irrespective of the normal velocity of the fluid through the meter under the then controlling conditions of operation.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is a sectional view through an end of a meter taken on a horizontal plane and showing parts in partially tripped position.

Figure 2 is a section through an end of the meter at right angles to Figure 1, showing parts in full open or untripped position.

Figure 3 is a detail section of portions of the valve actuating and tripping means, showing in full lines the parts in the same positions as in Figure 1.

Figure 4 is an elevation of the same parts and shown in the same positions as in Figure 3.

While my invention may be used in combination with meters of widely varying characteristics and constructions, it is particularly adaptable to a meter of the type which is illustrated in my Patent No. 1,505,306 which may be generally designated as of the positively-acting type, and I shall, therefore, describe it in that connection. In such a meter a piston 2 is reciprocable within a cylinder 1. The cylinder 1 and the head 10 secured thereupon are provided with an inlet passage 11 and a discharge passage 12. To control the operation of the meter I employ an inlet valve 30, connected by a yoke 31 to move with a discharge valve 3. These valves are shown as reciprocable axially of the cylinder within the head 10.

Power storage mechanism, energized through the advance of the piston 2, is situated within the cylinder, and operates at the proper time to actuate the control valves. Included within such power storage mechanism is a detent for the valves, pivoted at 40 within the head 10. This detent comprises a dog 4 having a shoulder 41, and a trip 42. The shoulder 41 is engageable with an edge of the yoke 31 or with a member 32 secured to move therewith. The trip 42 extends inwardly of the dog 4 and is engageable by an inclined surface 21 of the piston as the piston moves axially within the cylinder, to raise the shoulder 41 from engagement with the member 32. Suitable means serve to throw the valves from one position to another as the trip 42 is operated, through the advance of the piston, to release the dog 4. For this purpose a spring 33 is shown interposed between the piston 2 and the member 32 and supported if desired upon a rod 22, which passes through the piston. This spring, being compressed by the advance of the piston under the influence of the pressure of the fluid being measured or otherwise, throws the member 32 outward to reverse the position of the valves 3 and 30 when the dog 4 is released from the member 32.

The meter as described above is of the general type described in my patent referred to above. In the operation of fluid meters of this type, lacking my present invention, and wherein the time of action of the valves is determined by a tripping action initiated by the travel of the piston, it has been found that the accuracy of measuring varies with the speed of operation, the amount delivered being relatively greater at a high speed than at a low speed.

That the accuracy of such meters is dependent upon the speed of operation of the meter, can best be understood when it is considered that the speed of travel of the piston is dependent wholly upon the velocity of the fluid through the meter, while the time elapsing between the beginning of the valves' movement in reversing their positions and the completion thereof is at all times a constant under the influence of a substantially constant force, that is, the force of the spring 33 compressed by a given amount prior to release of the power-storage mechanism. As the time of beginning the reversal of the valves is controlled by contact of the piston, as it advances, with the trip member 42 to release the holding dog 4, this initiation of the reversal of the valves must always occur when the piston is a given distance from the end of its stroke; the time for the piston to complete its stroke, however, is dependent upon its velocity. As the velocity of the fluid through the meter increases, the piston's velocity increases, and more fluid can pass through a given port area in a given period of time. At the time the reversal of the valves is initiated, whatever the velocity of the piston, the spring 33 has been compressed a given amount, and acts with a constant force to close the valves. The time elapsing during their closure, then, is always constant, disregarding the influence of different densities and different viscosities in retarding or accelerating movement of these valves. It must follow that different speeds of operation must produce inaccuracies in the amount delivered, more being delivered at high speeds than at low, because at the higher speeds more fluid gets past the valves during the time consumed in their closing.

To correct the error which occurs in this manner I have provided means whereby the velocity of the piston and of the fluid through the valves is made constant at the end of each stroke, so that during the time the valves are actually reversing their positions the piston is always moving at a given speed, whatever may have been its velocity theretofore. This insures that exactly the same amount of fluid will pass through the valves during any period when they are in process of reversing in position, and obviates any inaccuracy from this cause. I have accomplished this by slowing down the piston, in the final stage of each stroke, to a point where its velocity is low, and by almost but not quite closing the discharge valves prior to opening the inlet valves at the same ends, so that the amount of fluid passing the valves during the final step of reversing them is negligible, both because of the low velocity of the fluid and because of the short distance the valves must move to finally reverse their positions. As a matter of fact, the closing down of the discharge valves automatically slows down the piston's velocity, and it is this principle which I employ in my invention.

The means which I have shown for accomplishing this include a recess 53 in the member 32 within which is received a pin 5. The pin may be provided with a head 51 which is intended to come flush with the dog-engaging face of the member 32. The head 51 extends outward beyond the outer edge 34 of the dog-engaging or outer face of the member 32, as is best shown in Figure 4. The shoulder 41 of the dog has its edge shaped to correspond with the edge 34, this edge being cut away slightly if desired. A spring 52 may be employed to maintain the pin 5 projected toward the shoulder 41. This is preferred, although the use of the spring is not essential. If desired, a slot may be cut in an edge of the head 51 to receive a key 54 in the member 32, thus to prevent rotation of the pin in its recess.

As the trip 42 is raised by contact of the inclined surface 21 therewith, during the advance of the piston towards this end of the cylinder, the dog 4 is raised towards the edge 34 of the member 32. During this time the dog spans the recess 53 in which is mounted the pin 5. As the lower edge of the shoulder 41 is raised above the edge 34, the spring 33, which has been compressed by this time by the advance of the piston 2, throws the member 32, the yoke 31 and the valves 3 and 30, towards the position for reversal of the valves.

The shoulder 41, however, has remained in engagement with the upwardly projecting portion of the head 51. The spring 52 then permits the pin 5 to yield until its head contacts with the stop shoulders 55 on the member 32. The position of the parts is then such that the discharge valve 3 is partially, preferably more than half, closed, although the intake valve 30 at the same end of the cylinder is not yet opened. Continued advance of the piston 2 raises the shoulder 41 in the same manner until it finally passes from engagement with the head 51, whereupon the reversal of the valves is completed. The distance remaining to be traversed by the discharge valve in closing has been reduced by the primary closing movement to such an extent that the time of final closure is reduced so that the fluid passing therethrough as it closes is so small in amount as to produce no appreciable error in the amount of fluid delivered from the meter, even at widely varying speeds of operation. In effect, two pairs of catch elements cooperate, the first to hold the discharge valves in fully open position, and the second to hold them in nearly closed position. One element of these two pairs may be common to both; that is, the same dog 4 may serve in each pair, but this is not essential, and two wholly separate pairs of cooperating catch elements may be employed if desired.

The pin 5 may be dispensed with if desired, although its use is preferred. In case it is not to be employed the stop 55 is positioned to be engaged by the shoulder 41 after the shoulder has passed from engagement with the principal portion of the member 32. The method of operation is in this case identical with that described above.

Meters of a size to accommodate a two-inch pipe and in which the valves have a normal opening of one-fourth inch for each of the several ports, are arranged so that after primary or partial actuation of the valves the discharge valve will be closed from one-fourth inch to .010 of an inch opening, while the intake valve at the opposite end of the cylinder will close from one-fourth inch to .015 inch. By thus making the area of the intake valve openings larger than that of the corresponding discharge valve, the pressure acting upon the piston is retained but the extremely small area of the discharge valve so checks the velocity of the fluid passing therethrough, and consequently the velocity of the piston, that its rate of movement during and just prior to this closing movement may be said to be exactly constant, whatever the normal velocity of the fluid and piston. In addition, the valve area is so slight and the distance through which the valve must move to close so slight, that the time required to complete the closure is negligible and is constant under all conditions.

Actual tests have shown that a meter having a capacity range of five to seventy-five gallons per minute which was found to be two per cent in error due to varying velocities, and in which the valve port was one-fourth inch, upon the employment of this invention the percentage of error was diminished by a ratio which is directly proportional to the ratio of the final port opening, say .010 of an inch to the normal port opening, one-fourth inch. It can be seen, then, that the error is negligible, and in fact with meters which have been built and tested through long continued use, it has been found that the use of this invention has in fact cut down the error from varying velocities to practically nothing.

What I claim as my invention and desire to secure by Letters Patent of the United States is:—

1. In a fluid meter including a displacement member movable under the influence of the fluid being metered, meter control mechanism including members reversible in position and controlling the flow of fluid through the meter, and means included in said meter control mechanism, and cooperating with said reversible members to momentarily reduce the rate of flow of fluid through the meter to a predetermined maximum, just prior to complete reversal of the reversible members.

2. In a fluid meter, valves reversible in position to control the output of the meter, means for reversing the positions of said valves, and means for temporarily halting such reversal prior to complete reversal to reduce the velocity of fluid flowing through said valves to a constant minimum.

3. In a fluid meter, a movable metering member, valves reversible in position and ported seats associated therewith, said valves controlling the movement of the metering member and thereby the meter's output, means for reversing the positions of said valves, and means for temporarily halting such reversal to leave the valves in the position for flow in the same direction, but through ports of greatly reduced area.

4. In combination in a fluid meter, a valve, valve-actuating means including two stops, a dog releasable successively from said stops, the first stop being positioned to prevent inception of the movement of the valve, and the second stop being positioned to suspend such movement, prior to complete actuation of the valve, and means for releasing said dog in succession from said stops.

5. In a fluid meter, control valves, a dog, and valve-actuating means including a plurality of stops cooperating with and engageable by said dog, of said dog and series of stops, one being movable with the valves, and means for releasing the dog from the several stops in succession, one of said stops being positioned to engage the dog to prevent inception of the movement of the valves, and another stop being positioned to intercept the valve prior to its complete actuation.

6. In combination, in a fluid meter, valve actuating means, including a controlling stop, means engageable by said stop to prevent movement of the valve, and means for disengaging said latter means and the stop to permit partial actuation of the valve, said stop including means for delaying the final actuation of the valve.

7. In combination, in a fluid meter, a valve reversible in position to control the operation of said meter, and a pair of means cooperating to hold the valve normally in its extreme position in one direction, and means operable to release said pair of means, to permit partial reversal of the valve's position, said pair of means being thereafter reengageable, and said releasing means being operable thereafter to release the pair of means again to permit complete reversal of the valve's position.

8. In combination in a fluid meter, a discharge valve, means operable to close said valve, means controlling the time of inception of said valve-closing operation, means operable after such inception to suspend completion of the operation of the valve-closing means, said controlling means operating thereafter to permit complete closure of the valves.

9. In combination in a fluid meter, a control valve, valve actuating mechanism, including a plurality of stops, a detent engageable with one of said stops and releasable to control inception of the valve movement, and engageable with another stop to suspend final closure of the valve, after its initial release, and means continuing to operate until final closure of said valve to release said detent, whereby the valve is partially and then wholly released from said valve actuating mechanism in successive stages.

10. In combination in a fluid meter, a cylinder and a piston movable therein, the two forming the measuring mechanism, and piston-movement limiting means including control valve mechanism and a holding dog engageable with said valve mechanism and having a trip operable upon engagement by the piston near an end of its travel to release said holding dog, said valve mechanism including means for re-engaging said dog prior to stoppage of the piston's travel in the same direction, said trip being operable by the piston through continued movement thereof, in the same direction, to again release said holding dog.

11. In a fluid meter, a cylinder, a piston movable therein, inlet and outlet valves controlling the supply to and discharge from said cylinder, an actuating means for said valves, a detent for said actuating means including an element disposed in the path of movement of the piston and actuated thereby near the end of the piston's travel to permit movement of the valves under the influence of their actuating means, and a catch interposed and engageable between said detent and actuating means to prevent final actuation of the valves, said catch being releasable by movement of the piston just before the end of its travel.

12. In a fluid meter, a cylinder, a piston movable therein, inlet and outlet valves controlling the supply to and discharge from said cylinder, an actuating means for said valves, a detent for said actuating means including an element disposed in the path of movement of the piston and actuated thereby near the end of the piston's travel to permit movement of the valves under the influence of their actuating means, and means interposed between said detent and actuating means and yieldable to permit partial actuation of the valves, and then releasable for final actuation thereof.

13. In a fluid meter, a cylinder, a piston movable therein, inlet and outlet valves controlling the supply to and discharge from said cylinder, an actuating means for said valves including a yoke movable therewith, a detent including a dog engageable with said yoke and including a trip disposed in the path of movement of the piston and actuated thereby near the end of the piston's travel to permit movement of the valves under the influence of their actuating means, said yoke having a shoulder positioned to be engaged by said dog and to interrupt the movement of said valves following their actuation and before the valves are completely actuated, said dog being releasable to complete the actuation of the valves by continued movement of the piston in the same direction.

14. In a fluid meter, a cylinder, a piston movable therein, inlet and outlet valves controlling the supply to and discharge from said cylinder, an actuating means for said valves including a yoke movable therewith, a detent including a dog engageable with said yoke and including a trip disposed in the path of movement of the piston and actuated thereby near the end of the piston's travel to permit movement of the valves under the influence of their actuating means, said yoke having a recess positioned to be spanned by said dog, a pin movable in said recess and said dog being shaped to be still engaged with said pin after the dog has become disengaged from the yoke, and stops limiting relative movement between the pin and yoke while the dog remains in engagement with the pin.

15. In a fluid meter, a cylinder, a piston movable therein, inlet and outlet valves controlling the supply to and discharge from said cylinder, an actuating means for said valves including a yoke movable therewith, a detent including a dog engageable with said yoke and including a trip disposed in the path of movement of the piston and actuated thereby near the end of the piston's travel to permit movement of the valves under the influence of their actuating means, said yoke having a recess positioned to be spanned by said dog, a pin movable in said recess and said dog being shaped to be still engaged with said pin after the dog has become disengaged from the yoke, stops limiting relative movement between the pin and yoke while the dog remains in engagement with the pin, and a spring for normally maintaining said pin projected towards the dog-engaging face of the yoke, and yieldable under the influence of the valve-actuating means.

16. A two-stage trip or fluid meters having a discharge valve including a yoke movable with said valve and having a recess therein adjacent its edge, a dog engageable with said yoke and positioned to span said recess, the edge of said dog being shaped similarly to the corresponding edge of the yoke, and a pin yieldingly mounted in said recess, and having a portion extending beyond the edge of said yoke to be engaged by the dog when the latter becomes disengaged from the yoke, and releasing means for said dog.

17. In a fluid meter, in combination, a cylinder, a piston movable in the cylinder, a discharge valve, a closing means for said valve, and a valve tripping mechanism including a primary stop for said valve and means operable by the movement of the piston for releasing said stop, a secondary stop for said valve positioned to correspond with the position of the valve when slightly open, said releasing means being operable upon continued movement of the piston to release said second stop.

18. In a meter of the positively acting type including a movable metering member and a control valve therefor, means for closing said valve, a pair of primary catch elements cooperable to hold the valve fully open, one being movable in accordance with movement of the valve, a secondary catch element cooperating with an element of the first pair to form a second pair of like elements, said second pair acting after release of the first pair to hold the valve in slightly open position, and trip mechanism operable to release said pairs of catches in succession.

19. In a meter of the positively acting type including a movable metering member and a control valve therefor, means for closing said valve, two catch elements movable in accordance with the movement of the valve, a third catch element cooperating with the first two catch elements, the first two catch elements being each engageable in succession with the third catch element, the first to hold the valve fully open, and the second to hold the valve in partly open position, and trip mechanism operable by movement of the movable metering element to release both of said first two catch elements from the third, in succession.

20. In a fluid meter, in combination, a movable metering member, means for checking the normal velocities of fluid through the meter to a minimum velocity lower than all such normal velocities at the end of a metering cycle of said metering member, and means operable during the periods of minimum velocity to end the current metering cycle.

21. In a fluid meter, in combination, a cylinder and a piston reciprocable therein at varying velocities under the influence of fluid being measured, valves operable as the piston nears an end of its stroke to check the velocity of fluid through the meter, and a trip operable during the period of reduced velocity to cause reversal of the direction of movement of the piston.

22. In a meter of the positively acting type including a movable metering member and a control valve therefor, means for closing said valve, a plurality of means opposing said valve-closing means, and successively operable to hold said valve in a plurality of positions between fully open and fully closed, and tripping mechanism operable to release said valve-holding means in succession to close the valve in a progression of steps.

Signed at Portland, Oregon, this 21 day of July, 1921.

CARLOS J. BASSLER.